US006655125B2

(12) United States Patent
Johnson et al.

(10) Patent No.: US 6,655,125 B2
(45) Date of Patent: Dec. 2, 2003

(54) SYSTEM ARCHITECTURE FOR ELECTROMECHANICAL THRUST REVERSER ACTUATION SYSTEMS

(75) Inventors: Andrew T. Johnson, Scottsdale, AZ (US); Terry J. Ahrendt, Mesa, AZ (US); Richard J. Foley, Tempe, AZ (US); Michael R. Madsen, Rocky Mount, NC (US); Kevin K. Chakkera, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 118 days.

(21) Appl. No.: 10/006,640

(22) Filed: Dec. 5, 2001

(65) Prior Publication Data

US 2003/0101712 A1 Jun. 5, 2003

(51) Int. Cl.[7] .............................. F02K 1/76; F02K 1/54
(52) U.S. Cl. ............. 60/226.2; 244/110 B; 239/265.19
(58) Field of Search ............................... 60/226.2, 230; 244/110 B; 239/265.19–265.31

(56) References Cited

U.S. PATENT DOCUMENTS

| 3,514,952 | A | | 6/1970 | Schumacher et al. |
| 3,515,361 | A | | 6/1970 | Blackburn |
| 3,618,880 | A | | 11/1971 | Hagaman et al. |
| 3,932,058 | A | | 1/1976 | Harner et al. |
| 4,191,094 | A | | 3/1980 | Flippo |
| 4,383,647 | A | | 5/1983 | Woodruff et al. |
| 4,788,531 | A | | 11/1988 | Corwin et al. |
| 5,044,155 | A | * | 9/1991 | Zimmerman .................. 60/224 |
| 5,167,119 | A | | 12/1992 | Ward |
| 5,267,436 | A | | 12/1993 | Wood, Jr. et al. |
| 5,615,549 | A | | 4/1997 | Valleroy |
| 5,796,935 | A | * | 8/1998 | Morrison et al. ............. 714/11 |
| 5,960,626 | A | | 10/1999 | Baudu et al. |
| 6,009,356 | A | | 12/1999 | Monroe |
| 6,021,636 | A | | 2/2000 | Johnson et al. |
| 6,439,504 | B1 | * | 8/2002 | Ahrendt ..................... 60/226.2 |
| 6,519,929 | B2 | * | 2/2003 | Ahrendt ..................... 60/226.2 |
| 6,526,744 | B2 | * | 3/2003 | Ahrendt ........................ 60/204 |
| 2003/0070416 | A1 | * | 4/2003 | Johnson et al. ............ 60/226.2 |

* cited by examiner

Primary Examiner—Ted Kim
(74) Attorney, Agent, or Firm—Keith Newburry, Esq.

(57) ABSTRACT

An electromechanical thrust reverser actuation system that is designed with non-symmetric redundant channels is interfaced with an aircraft engine control system that is also redundantly designed. In one embodiment, the engine control system is also designed with non-symmetric redundant channels, and in another embodiment it is designed with symmetric redundant channels.

38 Claims, 8 Drawing Sheets

SYSTEM ARCHITECTURE FOR ELECTROMECHANICAL THRUST REVERSER ACTUATION SYSTEMS

BACKGROUND OF THE INVENTION

The present invention relates to electromechanical thrust reverser actuation systems and, more particularly, to a system architecture for interfacing an electromechanical thrust reverser actuation system to an engine control system having a plurality of redundant channels.

When jet-powered aircraft land, the landing gear brakes and imposed aerodynamic drag loads (e.g., flaps, spoilers, etc.) of the aircraft may not be sufficient to slow the aircraft down in the required amount of distance. Thus, jet engines on most aircraft include thrust reversers to enhance the stopping power of the aircraft. When deployed, thrust reversers redirect the rearward thrust of the jet engine to a forward direction, thus decelerating the aircraft. Because the jet thrust is directed forward, the aircraft will slow down upon landing.

Various thrust reverser designs are known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. As will be discussed more fully below, each of these designs employs a different type of "moveable thrust reverser component," as that term is defined below.

Cascade-type thrust reversers are normally used on high-bypass ratio jet engines. This type of thrust reverser is located at the engine's midsection and, when deployed, exposes and redirects air flow through a plurality of cascade vanes positioned on the outside of the engine. The moveable thrust reverser component in this design may include several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser component to block the entire jet thrust coming from the rear of the engine. These doors are mounted on the aft portion of the engine and form the rear part of the engine nacelle. Pivot door thrust reversers may utilize four doors on the engine nacelle as the moveable thrust reverser component. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process. More specifically, once the aircraft has touched down on the runway, the thrust reversers are deployed to assist in slowing the aircraft. Thereafter, when the thrust reversers are no longer needed, they are returned to their original, stowed position. In the stowed position, one or more stow seals prevent air from flowing through the transcowls or doors, depending on the thrust reverser design. Moreover, stow locks are engaged to prevent unintended deployment of the thrust reversers.

The movement of the thrust reverser moveable components in each of the above-described designs is most often accomplished via a hydraulic system. Such systems include hydraulic controllers and lines coupled to the aircraft's hydraulic system, hydraulic actuators connected to the moveable components, and hydraulically controlled locking mechanisms. More recently, however, thrust reverser actuation is being controlled by electromechanical systems. These systems include one or more electronic controllers that control the operation of electromechanical actuators that are connected to the moveable components, and one or more electrically operated locking mechanisms. One such electromechanical thrust reverser system is shown in U.S. Pat. No. 5,960,626 ("the '626 patent").

An electromechanical thrust reverser actuation system includes safety critical control and indication functions, such as control and position indication of the thrust reverser locking mechanisms and position indication of the thrust reverser moveable components. This is significant since aviation systems that include control and indication functions that are classified as essential or critical to flight safety are required to meet certain design criteria. These design criteria include both redundancy and separation of the critical control and indication functions, which are implemented in one of two ways. The first is through the use of a symmetric system architecture and the second is through the use of a primary/alternate system architecture. With a symmetric system architecture, all control and indication functions are implemented in functionally similar, but electrically isolated, channels. With a primary/alternate system architecture, all control and indication functions, including both essential and non-essential functions, are included in the primary channel, and all essential control and indication functions are included in an alternate, electrically isolated (and perhaps physically isolated) channel.

Hence, in order for an electromechanical thrust reverser actuation system to be commercially viable, it should be designed to meet the above-noted redundancy and separation requirements. Moreover, it should also be designed to interface directly to the aircraft engine control system, such as the Fully Automated Digital Engine Control ("FADEC) system, which is also designed to meet the redundancy and separation requirements. The electromechanical thrust reverser system disclosed in the '626 patent does not address the use of multiple channels, but instead shows a system being coupled to a single FADEC channel. The failure of this single FADEC channel could result in loss of safety critical thrust reverser control and/or indication functions.

Hence, there is a need for an electromechanical thrust reverser system architecture that meets redundancy and separation requirements and interfaces with an engine control system that is also designed to meet these requirements. In addition, a very cost effective and lightweight electromechanical thrust reverser actuation system design uses the primary/alternate system architecture. However, many aircraft designs use a symmetric architecture in their engine control systems. Hence, there is additionally a need for a primary/alternate electromechanical thrust reverser actuation system architecture that interfaces with a symmetric channel engine control architecture.

SUMMARY OF THE INVENTION

The present invention provides a system architecture for interfacing an electromechanical thrust reverser actuation system that meets redundancy and isolation requirements to an aircraft engine control system that is also designed to meet redundancy and isolation requirements.

In an aspect of the present invention, and by way of example only, an electromechanical thrust reverser actuation system for interfacing to a jet engine control system having at least first and second engine control system channels, a thrust reverser controller, and at least one motor. The thrust reverser controller has at least two electrically isolated thrust reverser controller channels, each of which is coupled to receive command signals from one of the engine control channels and at least one of the thrust reverser controller channels and is operable, in response to the commands, to transmit thrust reverser motor actuation control signals. The motor is coupled to receive the thrust reverser motor actuation control signals from one of the thrust reverser control channels and is operable, in response thereto, to move a thrust reverser between a stowed position and a deployed position.

Other features and advantages of the present invention will become apparent from the following detailed description, taken in conjunction with the accompanying drawings, which illustrate, by way of example, the principles of the invention.

DETAILED DESCRIPTION OF VARIOUS EMBODIMENTS

Before proceeding with a detailed description of the various embodiments, it is to be appreciated that the thrust reverser control system described below may be used in conjunction with either of the above-described engine control systems. That is, with either an asymmetric engine control system or a symmetric engine control system. The skilled artisan will appreciate that a detailed discussion of the engine control system, be it asymmetric or symmetric, is not necessary to understand the present invention and is, therefore, not included. It will be additionally appreciated that the below description, when referring to an engine control system, encompasses either an asymmetric or symmetric engine control system architecture.

In each of the embodiments depicted and described up to this point, the thrust reverser control system is interfaced to an asymmetric engine control system architecture. As previously noted, with a symmetric engine control system architecture, all of the control and indication functions, both critical and non-critical, are rendered in a plurality of functionally similar channels. Many engine control systems in both existing and newly designed aircraft are implemented using the symmetric system architecture. However, as was also noted above, the lightest weight and lowest cost electromechanical thrust reverser actuation system is implemented using the asymmetric, primary/alternate system architecture. Hence, in the following embodiments, the asymmetric electromechanical thrust reverser actuation system architecture is interfaced to a symmetric engine control system architecture.

Figure 1:
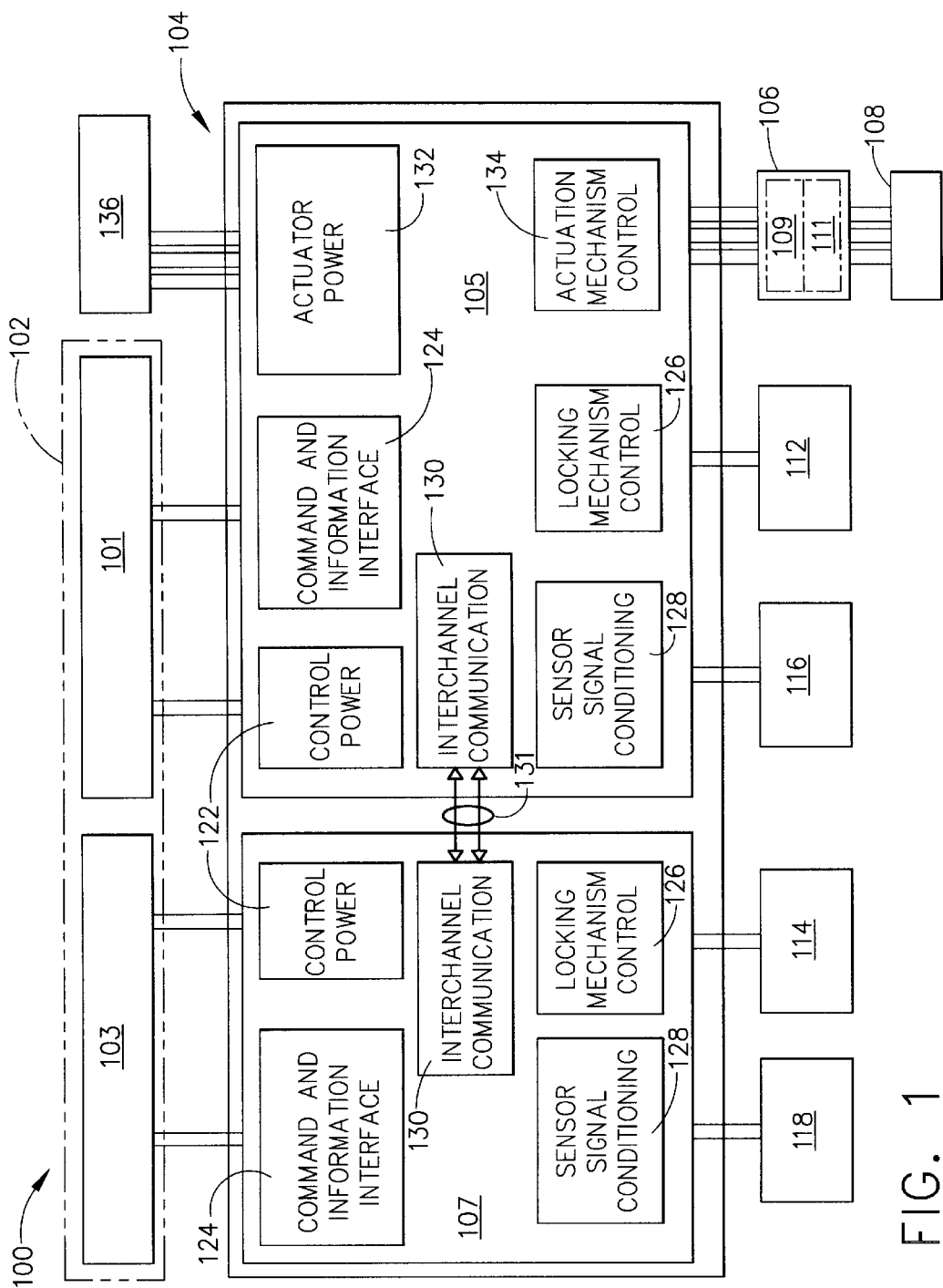
FIG. 1 is a functional block diagram of the system architecture for an electromechanical thrust reverser actuation system according to a first embodiment of the present invention.

Turning now to the description, a functional block diagram of a first embodiment of the system architecture of an electromechanical thrust reverser actuation system is depicted FIG. 1. The system 100 includes a thrust reverser controller 104, a plurality of electromechanical actuation mechanisms 106, a plurality of primary 112 and alternate 114 locking mechanisms, and a plurality of primary 116 and alternate 118 position sensors. The system 100 is interfaced to an engine control system 102, which may be any one of numerous known engine control systems that are implemented, as noted above, using either the asymmetric or symmetric system architecture.

The engine control system 102 includes a plurality of redundant channels. Although any number of redundant channels could be utilized, in a preferred embodiment the number of channels is two, a first channel 101 and a second channel 103. Thus, with this implementation, all control and indication functions are included in the first channel and all control and indications functions requiring redundancy are included in the second channel 103. Additionally, with this system implementation, one of the channels 101 (103) is operating in a "control mode" and is used to control the overall operation of the system 100 while the other channel 103 (101) is operating in a "back-up," or "standby" mode. In the event a failure renders inoperable the channel 101 (103) operating in the control mode, the standby channel 103 (101) will automatically take over system operation.

The engine control system 102, as was alluded to above, controls the overall operation of the aircraft's engines, including the actuation mechanisms 106 and locking mechanisms 112, 114. The engine control system 102 also provides indication of various parameters that are deemed critical to flight safety, including thrust reverser and locking mechanism position. For example, when the aircraft pilot wants to deploy or stow the aircraft's thrust reversers, the pilot will enter the command into the engine control system 102. In response, the engine control system 102 transmits various command signals to the thrust reverser controller 104. The thrust reverser controller 104, as will be explained below, in turn controls the operation of various components to carry out the command and to provide position indication signals back to the engine control system 102.

The thrust reverser controller 104, as noted above, is coupled to receive the command signals from the engine control system 102. The thrust reverser controller 104, similar to the engine control system 102, also comprises a plurality of channels. Again, while any number of redundant channels could be utilized, in a preferred embodiment the number of channels is two, a first channel 105 and a second channel 107. The thrust reverser controller 104, in response to the received command signals, transmits actuation signals to the various components of the thrust reverser actuation system to carry out the required command. As FIG. 1 depicts, the thrust reverser controller first channel 105 and the thrust reverser controller second channel 107 are substantially symmetric. That is, each channel 105, 107 includes a control power block 122, a command and information interface block 124, a sensor conditioning block 128, a locking mechanism control block 126, and an interchannel communication block 130. In addition, the primary channel 105 includes an actuation power block 132 and an actuation mechanism control block 134.

The control power blocks 122 in the thrust reverser controller first 105 and second 107 channels are coupled to receive control power of a relatively low magnitude from the engine control system first 101 and second 103 channels, respectively. This control power is used to control various low power circuits and components of the thrust reverser controller first 105 and second 107 channels, along with the sensors 116, 118 and possibly the locking mechanisms 112, 114.

The command and information interface blocks 124 in the thrust reverser controller first 105 and second 107 channels are each coupled to receive command signals from the engine control system channel 101 (103) that is being used to control overall system 100 operation, and to transmit information, such as locking mechanism and thrust reverser position, back to the engine control system first 101 and second 103 channels. More particularly, if the engine control system first channel 101 is operating in the control mode, and the engine control system second channel 103 is operating in the standby mode, then the command and information interface block 124 in the thrust reverser controller first channel 105 receives the command signals from the engine control system first channel 101. In turn, the command and information control block 124 in the thrust reverser controller first channel 105 transmits command signals to the locking mechanism control block 126 and the actuation mechanism control block 132 in the thrust reverser controller first channel 105 and, via the interchannel communication blocks 130, to the locking mechanism control block 126 in the second channel 107. The actuation mechanism control block 134 and the locking mechanism control blocks 126 then cause the actuation mechanisms 106 and locking mechanisms 112, 114 to operate as commanded by the engine control system 102. The sensor signal conditioning blocks 128 in the thrust reverser controller first 105 and second 107 channels appropriately conditions the position signals received from their respective position sensors 116, 118. The conditioned position signals are then transmitted to the command and information interface block 124 in the thrust reverser controller first channel 105, via the interchannel communication blocks 130, as appropriate, and then to the engine control system first channel 101.

The interchannel communication blocks 130 in the thrust reverser controller first 105 and second 107 channels, as was alluded to above, transmit command and control signals, as well as position sensor signals, between the two channels. Thus, when the engine control system first channel 101 is operating in the control mode and the engine control system second channel 103 is operating in the standby mode, command and control signals are transmitted to the thrust reverser controller second channel 107 via the thrust reverser controller first channel and the interchannel communication blocks. Similarly, position sensor signals received by the thrust reverser controller second channel 107 are transmitted to the thrust reverser controller first channel 105, for transmission to the control system first channel 101, via the interchannel communication blocks 130. It will be appreciated that the interchannel communication blocks 130 similarly supply command and control signals to, and receive sensor information signals from, the thrust reverser controller first channel 105, via the second channel 107, when the engine control system second channel 103 is operating in the control mode and the engine control system first channel 101 is operating in the standby mode.

The interchannel communication blocks 130 not only communicate command, control, and information signals between the thrust reverser controller first 105 and second 107 channels, but also communicate channel health with one another. In other words, each interchannel communication block 130 communicates whether or not the channel into which it is installed is energized and/or operating properly. If it is not, then the interchannel communication block 130 in the faulty channel informs the other channel that its particular channel is inoperable. An indication of a channel fault is then transmitted to the engine control system first 101 or second 103 channel, as appropriate. It is noted that the interchannel communication blocks 130 are electrically isolated, thereby maintaining isolation amongst the thrust reverser controller primary 105 and alternate 107 channels, and thus the engine control unit first 101 and second 103 channels. The method of providing this electrical isolation may be any one of numerous methods known in the art, but is preferably provided via an optical, high-speed data communication line.

As noted above, the thrust reverser controller primary channel 105 includes both the actuation power block 132 and the actuation mechanism control block 134. The actuation power block 132 is coupled to receive a relatively high magnitude voltage signal, such as a 3-phase, 115 VAC signal, from an independent power source 136. The actuation power block 132 filters and conditions, as appropriate, this AC signal. The actuation mechanism control block 134 receives the filtered and conditioned AC signal from the actuation power block 132 and transmits appropriately conditioned power signals to the electromechanical actuation mechanisms 106. For example, in a preferred embodiment, the actuation power block 132 provides a DC voltage signal of appropriate magnitude to the actuation mechanism control block 134. The actuation mechanism control block 134 in turn inverts the DC signal to provide an AC signal to the electromechanical actuation mechanisms 106.

The electromechanical actuation mechanisms 106, as depicted in FIG. 1, includes one or more electric motors 109 mechanically coupled to one or more actuators 111. The actuators 111 are mechanically coupled to the moveable thrust reverser components 108. Thus, rotation of the electric motors 109 causes movement of the actuators 111, which results in movement of the moveable thrust reverser components 108.

In the system 100 depicted in FIG. 1, the thrust reverser controller 104 is implemented in the asymmetric system architecture and interfaces with the engine control system 102, which may be implemented in either the asymmetric or symmetric system architecture. The control power for the redundant thrust reverser controller channels 105, 107 is provided from isolated power supplies within the engine control system first 101 and second 103 channels. Thus, electrical separation is maintained. Yet another electromechanical thrust reverser actuation system architecture that implements this electrical separation is to use a physically separate alternate channel, as depicted in FIG. 2.

Figure 2:
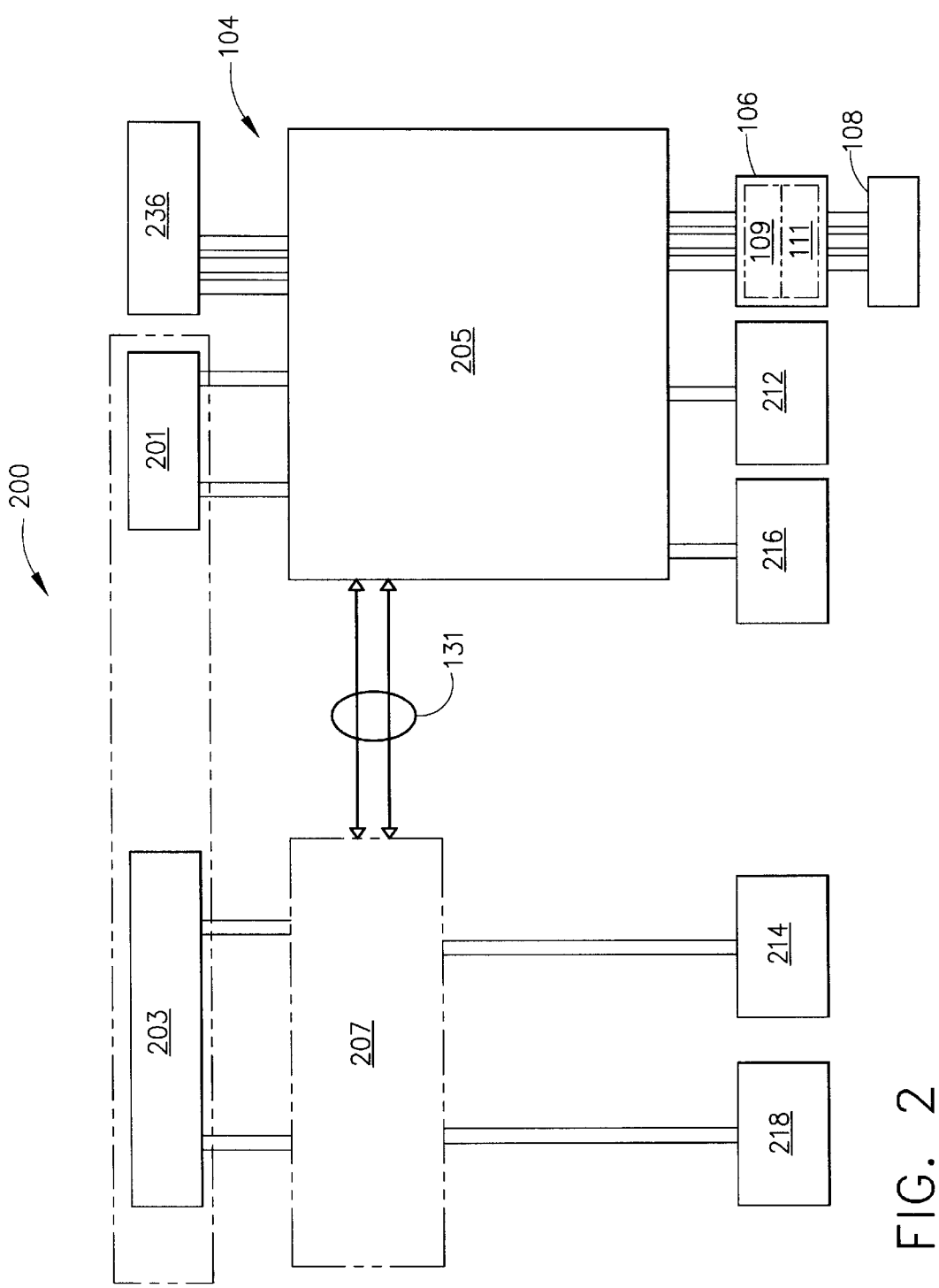
FIG. 2 depicts and alternative arrangement of the system depicted in FIG. 1.

The system 200 depicted in FIG. 2 is coupled to an engine control system 202 including a second engine control system channel 203 that is physically separate from a first engine control system channel 201. In addition, the thrust reverser controller 104 includes only a single, primary channel 205 coupled to the first channel 201. A separate, alternate channel 207 is physically separated from the thrust reverser controller 104, and is coupled to the second engine control system channel 203. Though not explicitly depicted, it is understood that the thrust reverser controller 104 according to this embodiment includes the same functional blocks as the thrust reverser controller primary channel 105 depicted in FIG. 1, and is coupled to an independent source 236 of high electric power, such as 3-phase 115 VAC, and to a plurality of primary locking mechanisms 212 and primary position sensors 216. In addition, the separate channel 207 includes the same functional blocks as the thrust reverser controller alternate channel 107, and is coupled to a plurality of alternate locking mechanisms 214 and alternate position sensors 218. The thrust reverser controller 104 and separate channel 207 preferably each include an interchannel communication block 230, functionally identical to the embodiment of FIG. 1, for communicating command, control, and indication signals, as well as channel health one with the other.

Figure 3:
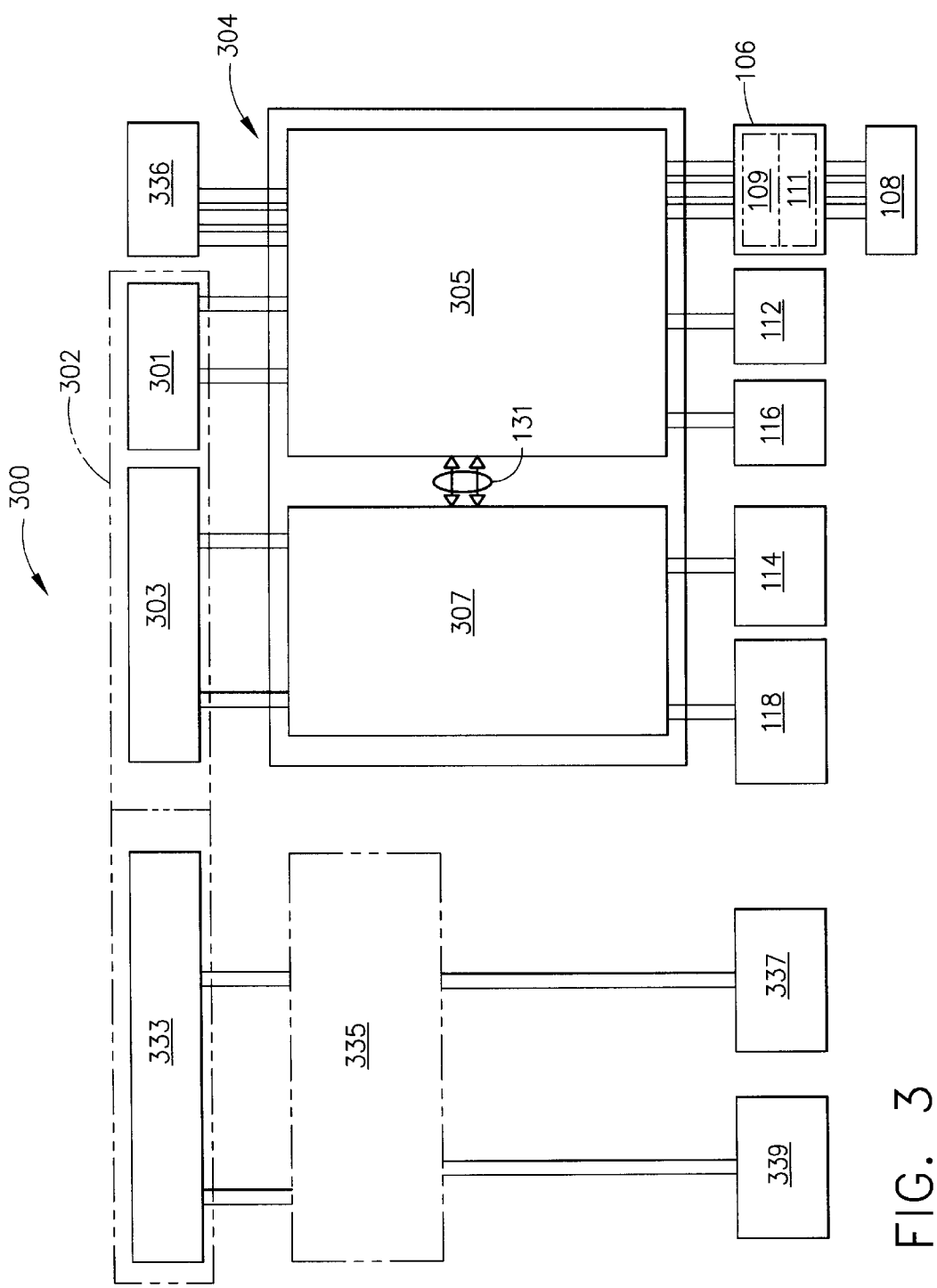
FIG. 3 depicts yet another alternative embodiment of the system of FIG. 1 with additional independent retention and sensing channels.

As FIG. 3 depicts, in yet another alternative embodiment the system 300 may be implemented using a combination of the embodiments depicted in FIGS. 1 and 2. Specifically, the system 300 includes an engine control system 302 having a first 301 and second 303 channel, and a physically separate tertiary channel 333. Similarly, the system 300 includes a thrust reverser controller 304 having both a primary 305 and alternate 307 channel, and a physically separate tertiary channel 335. Similar to the previous embodiments, the thrust reverser controller primary channel 305 is coupled to an independent source 336 of high electric power, such as 3-phase, 115 VAC. With this embodiment, however, yet another plurality of alternate locking mechanisms 337 and position sensors 339 are included, and coupled to the thrust reverser controller alternate channel 335.

Figure 4:
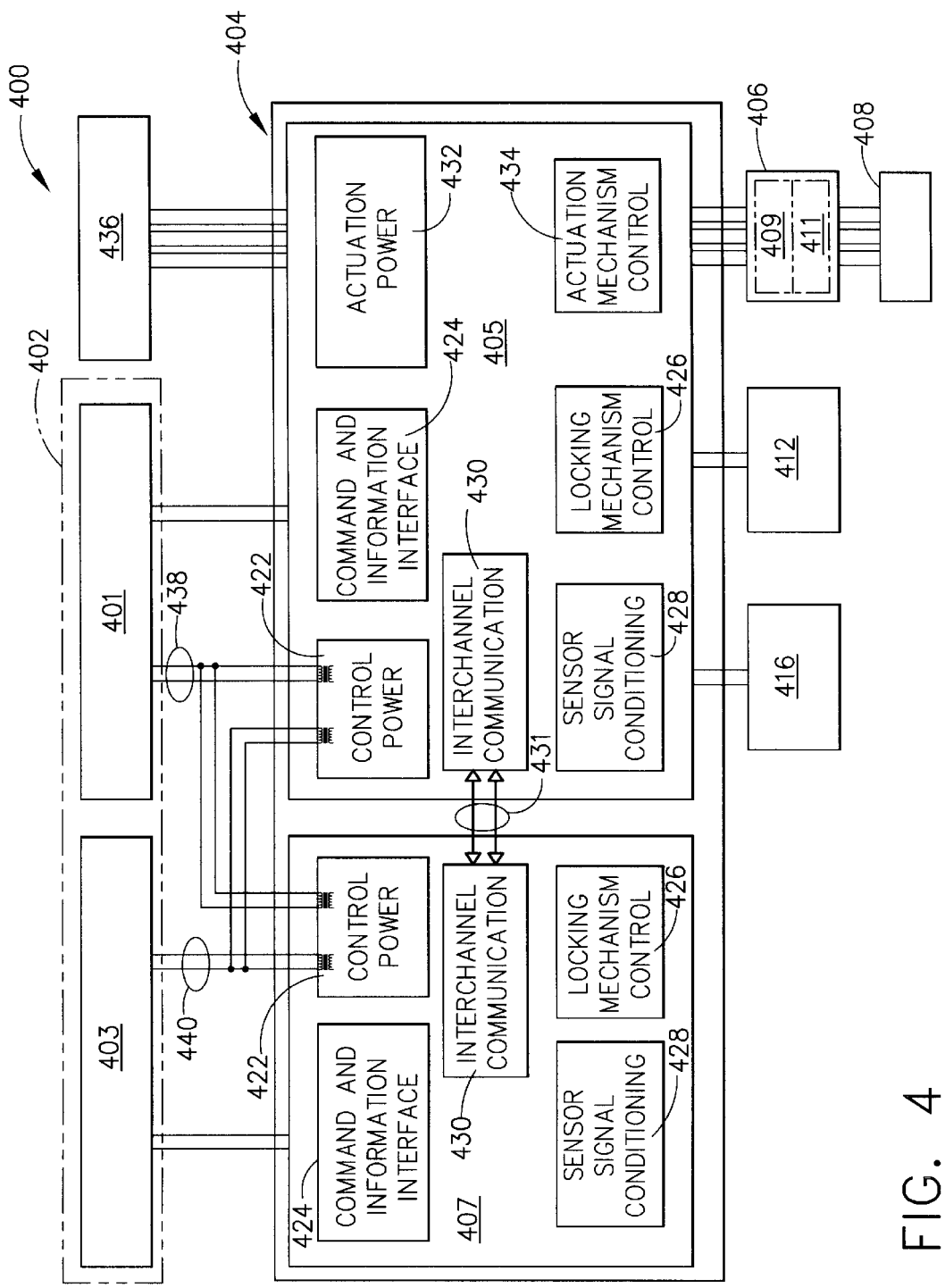
FIG. 4 is a functional block diagram of still another embodiment of a system architecture for an electromechanical thrust reverser actuation system.

Another embodiment of an asymmetric electromechanical thrust reverser actuation system architecture interfacing with an asymmetric or symmetric engine control system architecture is depicted in FIG. 4. In this system 400, the engine control system 402 also includes redundant first 401 and second 403 channels. Again, as with the previous embodiments, other numbers of redundant engine control system channels could be used. The use of two channels is merely exemplary of a preferred embodiment. The system 400 further includes a thrust reverser controller 404 that is coupled to each of the first 401 and second 403 engine control system channels. The thrust reverser controller 400 is coupled to plurality of electromechanical actuation mechanisms 406, which are in turn coupled to one or more moveable thrust reverser components 408, and is also coupled to a plurality of locking mechanisms 412, and position sensors 416.

As with the embodiments depicted in FIGS. 1 and 3, the thrust reverser controller 404 includes asymmetric, primary 405 and alternate 407 channels. Once again, it is noted that the use of two channels is only exemplary of a preferred embodiment, and that other numbers of channels could be used. Likewise, the thrust reverser controller 404, in response to command signals received from the engine control system 402, transmits actuation control signals to the various components of the thrust reverser actuation system to carry out the required command. Additionally, similar to the FIGS. 1 and 3 embodiments, each thrust reverser controller channel 405, 407 preferably includes a control power block 422, a command and information interface block 424, a locking mechanism control block 426, a sensor signal conditioning block 428, and an interchannel communication block 430 interconnected via an electrically isolated, high-speed data link 431, with the primary channel 405 additionally including an actuation power block 432 and an actuation mechanism control block 434. In addition, the thrust reverser controller primary channel 405 is coupled to an independent source 436 of high electric power, such as 3-phase, 115 VAC. Each of these functional blocks function substantially identical to those of the previous embodiments, with the exception of the control power blocks 422, whose function is described more fully below. It is again noted that this combination of functional blocks is merely exemplary of a preferred embodiment, and that various other functional blocks may be included in, or removed from, each channel 405, 407 as system requirements so demand.

With this embodiment, all of the information and control signals in the thrust reverser controller primary channel 405 to the thrust reverser controller alternate channel 405, and vice-versa. Moreover, both the thrust reverser controller primary 405 and alternate 407 channels make all information signals available to both the engine control system first 401 and second 403 channels. As a result, the engine control system 402 cannot determine whether it is linked to the thrust reverser controller primary 405 or alternate 407 channel. Hence, the thrust reverser controller 404, though physically implemented in the asymmetric primary/alternate system architecture, emulates a symmetric system architecture.

There are additional differences between the FIG. 4 embodiment and the previously described embodiments of FIGS. 1–3. Specifically, there are no redundant locking mechanisms or sensors. This latter difference is realizable due to the above-described system layout, wherein the thrust reverser controller 404 emulates a symmetric system architecture. Yet another difference between the embodiment of FIG. 4 and the previously described embodiments is the additional redundancy provided by cross-connecting the control power supplied from the engine control system 402. Specifically, the control power supply lines 438 from the engine control system first channel 401 are supplied to both the thrust reverser controller primary channel 405 and the thrust reverser controller alternate channel 407. Likewise, the control power lines 440 from the engine control system second channel 403 are supplied to both the thrust reverser controller primary channel 405 and the thrust reverser controller alternate channel 407. Electrical separation of the control power supplies in the engine control system first 401 and second 403 channels is maintained by either a diode, the depicted transformer arrangement, or other generally known isolation schemes.

Figure 5:
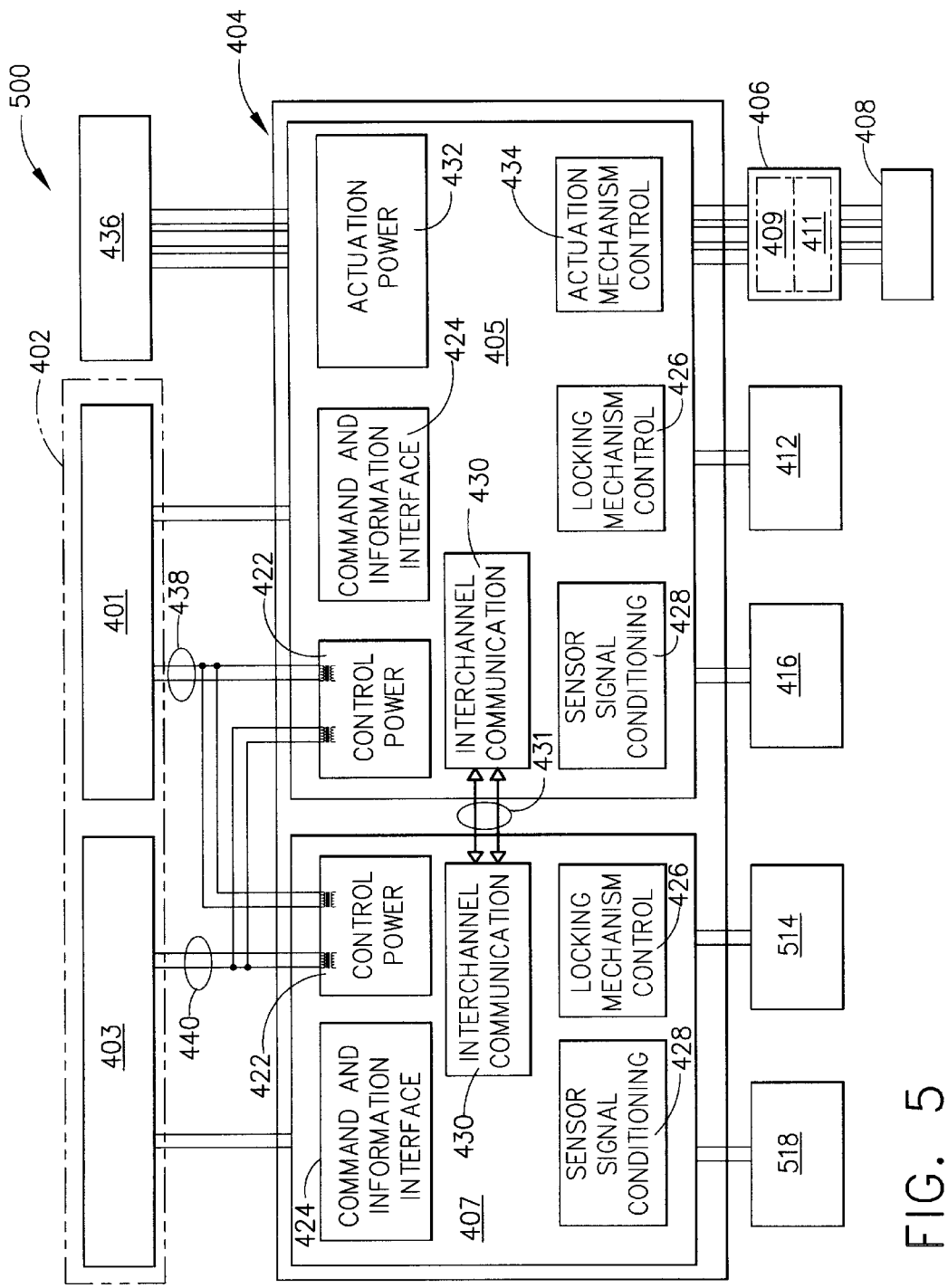
FIG. 5 depicts an alternative embodiment of the system of FIG. 4 with additional independent retention and sensing channels.

An alternative arrangement of the system depicted in FIG. 4 is implemented as somewhat of a hybrid of the systems of FIGS. 1 and 4. Specifically, as depicted in FIG. 5, the system 500 implemented in this alternative arrangement is substantially similar to that of FIG. 4, but includes a plurality of redundant locking mechanisms 514 and positions sensors 518. Though not necessary for system operability, the additional locking mechanisms 514 and position sensors 518 provide added redundancy and robustness to the system 500 that may be required to meet certain flight safety requirements and failure probability analyses.

Figure 6:
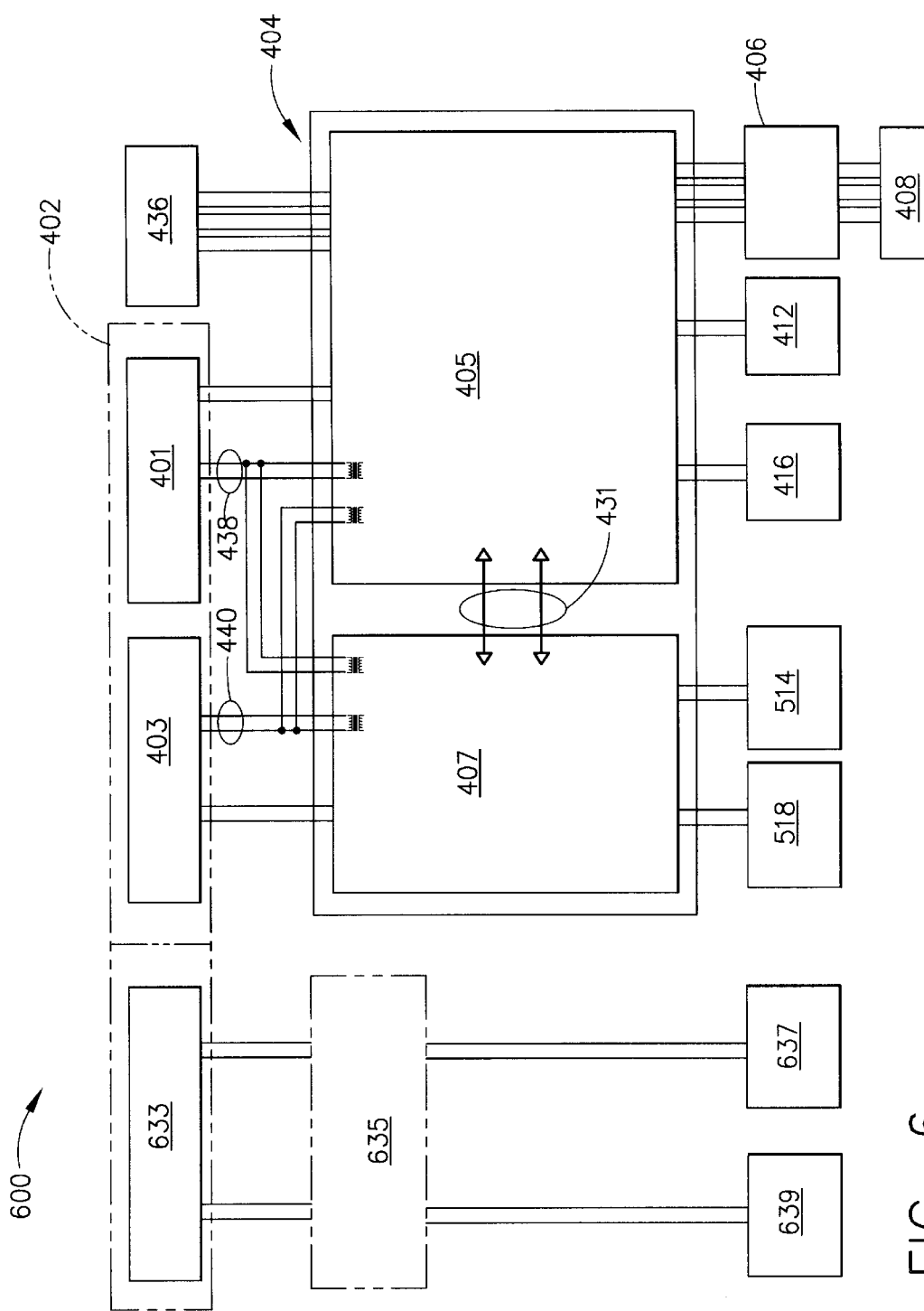
FIG. 6 depicts an alternative embodiment of the system of FIGS. 4 and 5 with yet more additional independent retention and sensing channels.

In yet another alternative arrangement, the embodiment depicted in FIG. 5 may be implemented as was similarly described above and depicted in FIG. 3. Specifically, as depicted in FIG. 6, this alternative system 600 includes an additional, physically separate hardwired tertiary channel 635. This tertiary channel 635, similar to the system 300 depicted in FIG. 3, is coupled to yet another plurality of alternate locking mechanisms 637 and positions sensors 639. The functional blocks that form each of the thrust reverser controller primary 405 and alternate 407 channels are not depicted in FIG. 6. However, it is to be understood that the functional blocks are included, and perform the same functions as those depicted in the previous embodiments. Thus, their depiction and description are not necessary to an understanding of the present invention.

Figure 7:
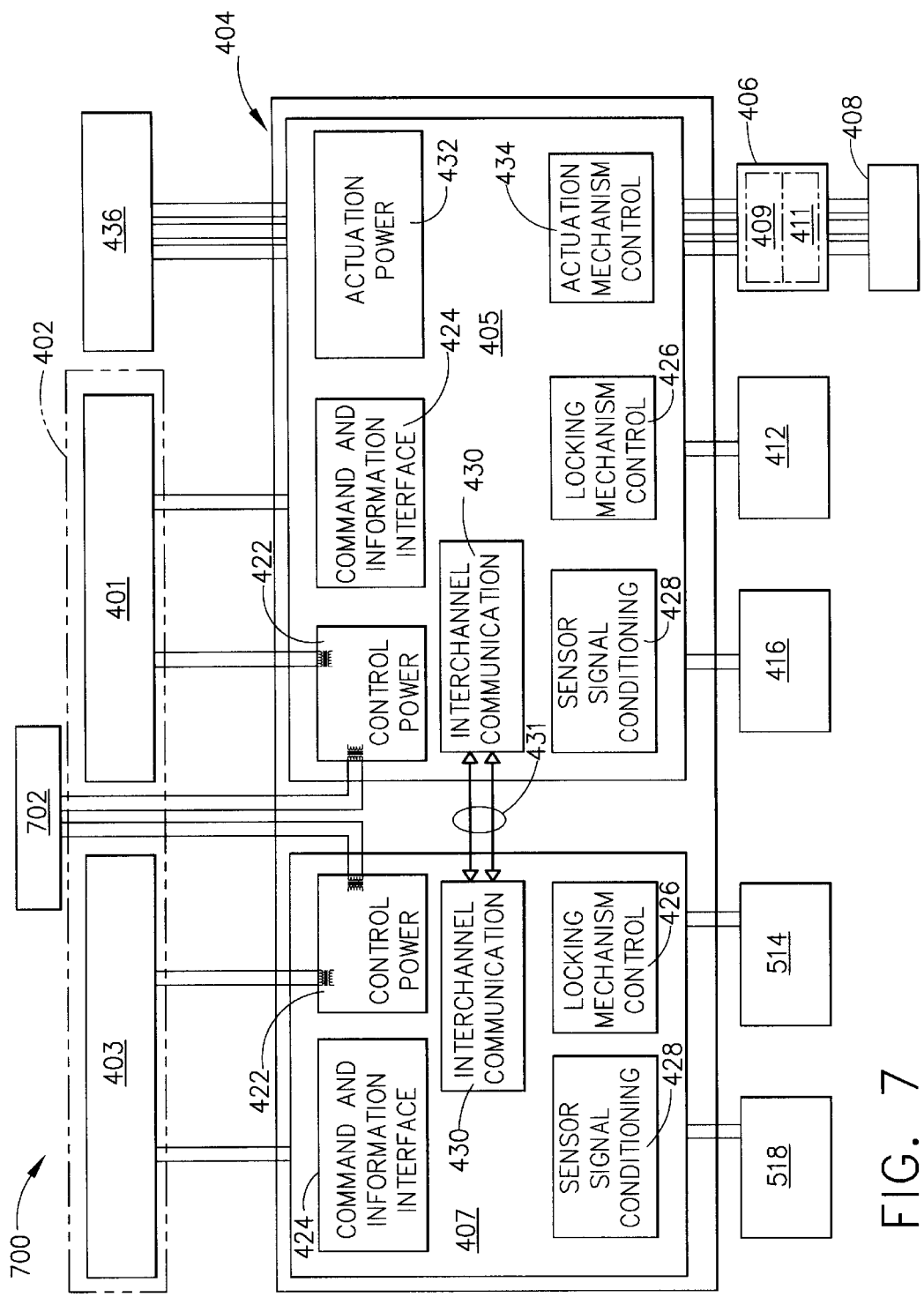
FIG. 7 depicts an alternative arrangement of the system depicted in FIG. 5 with and additional control power supply.
Figure 8:
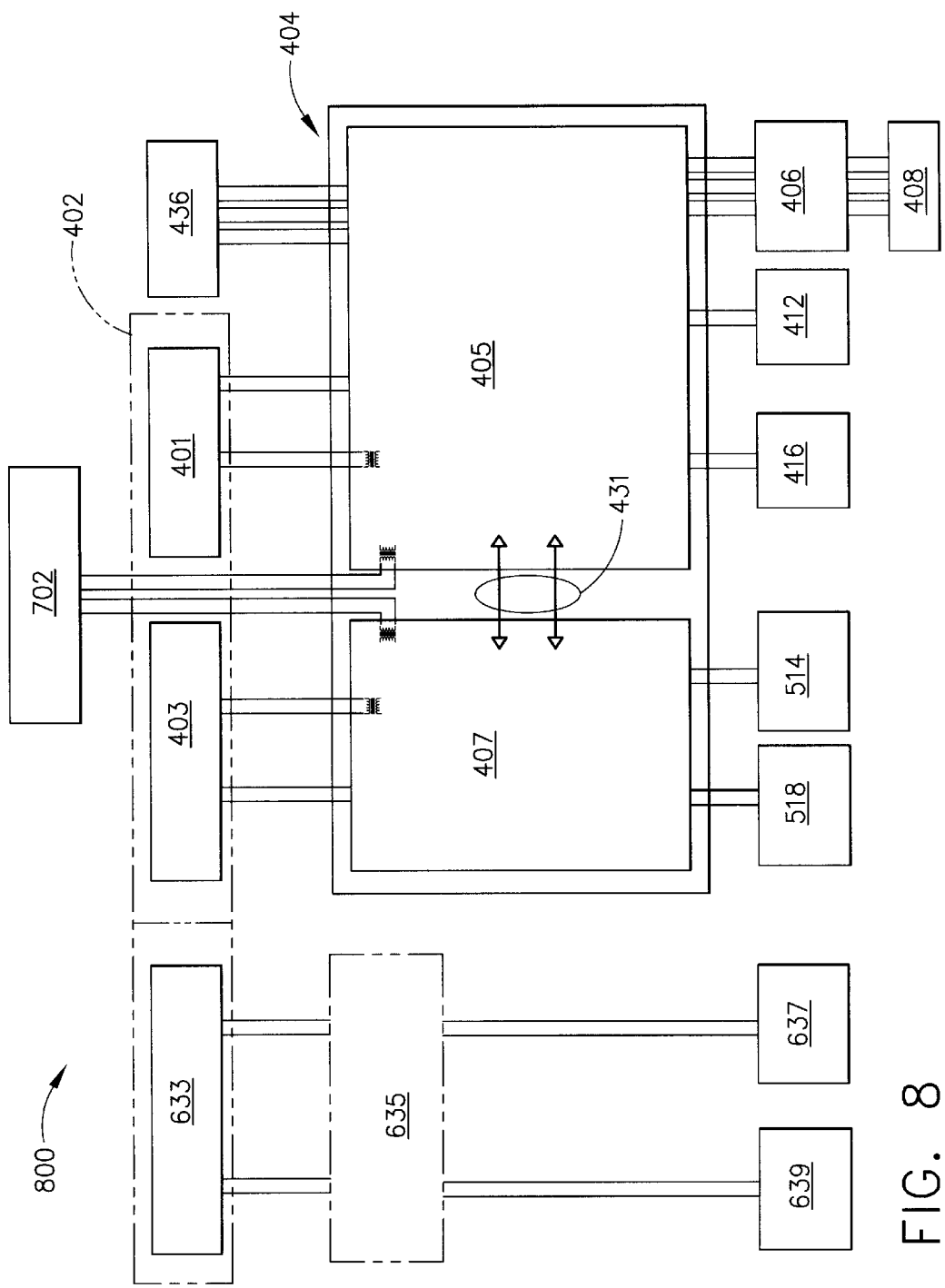
FIG. 8 depicts an alternative arrangement of the system depicted in FIG. 7 with additional retention and sensing control.

Under certain highly unlikely conditions, loss of control power electrical isolation could occur with cross-connected control power supplies. Thus, another alternative arrangement, which is applicable to the embodiments depicted in FIGS. 5 and 6, is to supply the thrust reverser controller primary 405 and alternate 407 channels with control power from the engine control system first 101 and second 103 channels, respectively, and from an aircraft dedicated power bus or generator 702. The systems 700, 800 designed in accordance with these additional alternative arrangements are depicted in FIGS. 7 and 8. Again, the functional blocks that form each of the thrust reverser controller primary 405 and alternate 407 channels are not depicted in FIG. 8, since it is understood that the functional blocks are included, and perform the same functions as those depicted in the previous embodiments. Thus, their depiction and description are not necessary to an understanding of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electromechanical thrust reverser actuation system for interfacing to a jet engine control system having at least first and second engine control system channels, the actuation system comprising:
   a thrust reverser controller having at least two electrically isolated thrust reverser controller channels, each of the thrust reverser controller channels coupled to receive command signals from one of the engine control channels and at least one of the thrust reverser controller channels operable, in response thereto, to transmit thrust reverser motor actuation control signals; and
   at least one motor coupled to receive the thrust reverser motor actuation control signals from one of the thrust reverser control channels and operable, in response thereto, to move a thrust reverser between a stowed position and a deployed position.

2. The actuation system of claim 1, wherein each of the thrust reverser controller channels is additionally operable to transmit locking mechanism control signals, and wherein the actuation system further comprises:
   at least one thrust reverser locking mechanism coupled to receive the locking mechanism control signals from one of the thrust reverser controller channels and operable, in response thereto, to lock and unlock the thrust reverser.

3. The actuation system of claim 2, further comprising:
   at least one thrust reverser locking mechanism position sensor operable to sense locking mechanism position and supply a signal representative thereof to one at least one of the thrust reverser controller channels.

4. The actuation system of claim 1, further comprising:
   at least one thrust reverser position sensor operable to sense thrust reverser position and supply a signal representative thereof to at least one of the thrust reverser controller channels.

5. The actuation system of claim 1, wherein the thrust reverser controller channels include a thrust reverser controller primary channel and a thrust reverser controller alternate channel.

6. The actuation system of claim 5, wherein the thrust reverser controller primary and alternate channels each have an interchannel communication circuit operable to communicate the command signals received in its thrust reverser controller channel to the other thrust reverser controller channel.

7. The actuation system of claim 6, wherein each of the interchannel communication circuits is further operable to communicate thrust reverser controller channel health one with another.

8. The actuation system of claim 5, wherein:
   the thrust reverser controller primary channel is coupled to receive command signals from the engine control system first channel; and
   the thrust reverser controller alternate channel is coupled to receive command signals from the second engine control channel.

9. The actuation system of claim 5, wherein the thrust reverser controller primary and alternate channels each include control power circuitry operable to supply operational control power to their respective channels, and wherein:
   the control power circuitry in the thrust reverser controller primary channel is coupled to receive control power from the engine control system first channel; and
   the control power circuitry in the thrust reverser controller alternate channel is coupled to receive control power from the engine control system second channel.

10. The actuation system of claim 5, wherein the thrust reverser controller primary and alternate channels each include control power circuitry operable to supply operational control power to their respective channels, and wherein the control power circuitry in the thrust reverser controller primary and alternate channels are each coupled to receive control power from both the engine control system first and second channels.

11. The actuation system of claim 5, wherein the thrust reverser controller primary and alternate channels each include control power circuitry operable to supply operational control power to their respective channels, and wherein:
   the control power circuitry in the thrust reverser controller primary channel is coupled to receive control power from the engine control system first channel and from an independent power source; and
   the control power circuitry in the thrust reverser controller alternate channel is coupled to receive control power from the engine control system second channel and from the independent power source.

12. The actuation system of claim 5, wherein the thrust reverser controller primary channel includes actuation mechanism power and control circuitry coupled to receive motor actuation power from a non-redundant power source and operable, in response to the command signals, to supply the motor actuation power to the motors.

13. The actuation system of claim 5, wherein the thrust reverser controller primary and alternate channels each include locking mechanism control circuitry operable, in response to the command signals received by their respective channels, to transmit thrust reverser lock actuation signals, and wherein the actuation system further comprises:
- at least one primary thrust reverser locking mechanism coupled to receive the thrust reverser lock actuation signals from the locking mechanism control circuitry in the thrust reverser controller primary channel and operable, in response thereto, to move between a locked and an unlocked position; and
- at least one alternate thrust reverser locking mechanism coupled to receive the thrust reverser lock actuation signals from the locking mechanism control circuitry in the thrust reverser controller alternate channel and operable, in response thereto, to move between a locked and an unlocked position.

14. The actuation system of claim 13, wherein the thrust reverser controller primary and alternate channels each include sensor signal conditioning circuitry operable to receive sensor signals and supply conditioned sensor signals, and wherein the actuation system further comprises:
- at least one thrust reverser position sensor coupled to the sensor signal conditioning circuitry in the thrust reverser controller primary channel, each thrust reverser position sensor operable to sense the position of a thrust reverser and supply sensor signals representative thereof;
- at least one primary thrust reverser locking mechanism position sensor coupled to the sensor signal conditioning circuitry in the thrust reverser controller primary channel, each thrust reverser primary locking mechanism position sensor operable to sense the position of a primary thrust reverser locking mechanism and supply sensor signals representative thereof; and
- at least one alternate thrust reverser locking mechanism position sensor coupled to the sensor signal conditioning circuitry in the thrust reverser controller alternate channel, each thrust reverser alternate locking mechanism position sensor operable to sense the position of an alternate thrust reverser locking mechanism and supply sensor signals representative thereof.

15. The actuation system of claim 14, wherein the engine control system includes a physically and electrically independent engine control system channel operable to transmit command signals, and wherein the actuation system further comprises:
- a thrust reverser controller tertiary channel that is electrically and physically isolated from the thrust reverser controller primary and alternate channels, the thrust reverser controller tertiary channel including thrust reverser locking mechanism control circuitry and sensor signal conditioning circuitry therein;
- at least one tertiary thrust reverser locking mechanism coupled to receive the thrust reverser lock actuation signals from the locking mechanism control circuitry in the thrust reverser controller tertiary channel and operable, in response thereto, to move between a locked and an unlocked position; and
- at least one tertiary thrust reverser locking mechanism position sensor coupled to the sensor signal conditioning circuitry in the thrust reverser controller tertiary channel, each tertiary thrust reverser locking mechanism position sensor operable to sense the position of a tertiary thrust reverser locking mechanism and supply sensor signals representative thereof.

16. The actuation system of claim 5, wherein the primary and alternate channels are physically isolated from one another.

17. An electromechanical thrust reverser actuation system for interfacing to a jet engine control system having at least first and second engine control system channels, the actuation system comprising:
- a thrust reverser controller having at least a primary thrust reverser controller channel and an alternate thrust reverser controller channel, each of the thrust reverser controller channels coupled to receive command signals from one of the engine control channels and operable, in response thereto, to transmit thrust reverser lock actuation control signals, and to cause the primary channel to transmit thrust reverser motor actuation control signals;
- at least one thrust reverser primary locking mechanism coupled to receive the thrust reverser lock actuation signals from the thrust reverser controller primary channel and operable, in response thereto, to move between a locked and an unlocked position;
- at least one alternate thrust reverser locking mechanism coupled to receive the thrust reverser lock actuation signals from the thrust reverser controller alternate channel and operable, in response thereto, to move between a locked and an unlocked position; and
- at least one motor coupled to receive the motor actuation control signals from the primary thrust reverser controller channel and operable, in response thereto, to move a thrust reverser between a stowed position and a deployed position.

18. The actuation system of claim 17, wherein the thrust reverser controller primary and alternate channels each have an interchannel communication circuit operable to communicate the command signals received in its thrust reverser controller channel to the other thrust reverser controller channel.

19. The actuation system of claim 18, wherein each of the interchannel communication circuits is further operable to communicate thrust reverser controller channel health one with another.

20. The actuation system of claim 17, wherein:
- the thrust reverser controller primary channel is coupled to receive command signals from the engine control system first channel; and
- the thrust reverser controller alternate channel is coupled to receive command signals from the second engine control channel.

21. The actuation system of claim 17, wherein the thrust reverser controller primary and alternate channels each include control power circuitry operable to supply operational control power to their respective channels, and wherein:
- the control power circuitry in the thrust reverser controller primary channel is coupled to receive control power from the engine control system first channel; and
- the control power circuitry in the thrust reverser controller alternate channel is coupled to receive control power from the engine control system second channel.

22. The actuation system of claim 17, wherein the thrust reverser controller primary and alternate channels each include control power circuitry operable to supply operational control power to their respective channels, and wherein the control power circuitry in the thrust reverser controller primary and alternate channels are each coupled to receive control power from both the engine control system first and second channels.

23. The actuation system of claim 17, wherein the thrust reverser controller primary and alternate channels each include control power circuitry operable to supply operational control power to their respective channels, and wherein:
 the control power circuitry in the thrust reverser controller primary channel is coupled to receive control power from the engine control system first channel and from an independent power source; and
 the control power circuitry in the thrust reverser controller alternate channel is coupled to receive control power from the engine control system second channel and from the independent power source.

24. The actuation system of claim 17, wherein the thrust reverser controller primary channel includes actuation mechanism power and control circuitry coupled to receive motor actuation power from a non-redundant power source and operable, in response to the command signals, to supply the motor actuation power to the motors.

25. The actuation system of claim 17, wherein the thrust reverser controller primary and alternate channels each include locking mechanism control circuitry operable, in response to the command signals by their respective channels, to transmit the thrust reverser lock actuation signals.

26. The actuation system of claim 17, wherein the thrust reverser controller primary and alternate channels each include sensor signal conditioning circuitry operable to receive sensor signals and supply conditioned signals, and wherein the actuation system further comprises:
 at least one thrust reverser position sensor coupled to the sensor signal conditioning circuitry in the thrust reverser controller primary channel, each thrust reverser position sensor operable to sense the position of a thrust reverser and supply sensor signals representative thereof;
 at least one primary thrust reverser locking mechanism position sensor coupled to the sensor signal conditioning circuitry in the thrust reverser controller primary channel, each primary thrust reverser locking mechanism position sensor operable to sense the position of a primary thrust reverser locking mechanism and supply sensor signals representative thereof; and
 at least one alternate thrust reverser locking mechanism position sensor coupled to the sensor signal conditioning circuitry in the thrust reverser controller alternate channel, each alternate thrust reverser locking mechanism position sensor operable to sense the position of an alternate thrust reverser locking mechanism and supply sensor signals representative thereof.

27. The actuation system of claim 26, wherein the engine control system includes a physically and electrically independent engine control system channel operable to transmit command signals, and wherein the actuation system further comprises:
 a thrust reverser controller tertiary channel that is electrically and physically isolated from the thrust reverser controller primary and alternate channels, the thrust reverser controller tertiary channel including thrust reverser locking mechanism control circuitry and sensor signal conditioning circuitry therein;
 at least one tertiary thrust reverser locking mechanism coupled to receive the thrust reverser lock actuation signals from the locking mechanism control circuitry in the thrust reverser controller tertiary channel and operable, in response thereto, to move between a locked and an unlocked position; and
 at least one tertiary thrust reverser locking mechanism position sensor coupled to the sensor signal conditioning circuitry in the thrust reverser controller tertiary channel, each tertiary thrust reverser locking mechanism position sensor operable to sense the position of a tertiary thrust reverser locking mechanism and supply sensor signals representative thereof.

28. The actuation system of claim 17, wherein the primary and alternate channels are physically isolated from one another.

29. An electromechanical thrust reverser actuation system controller for interfacing to a jet engine control system having at least first and second engine control system channels, the controller comprising:
 at least two electrically isolated thrust reverser controller channels, each of the thrust reverser controller channels coupled to receive command signals from one of the engine control channels and at least one of the thrust reverser controller channels operable, in response thereto, to transmit thrust reverser motor actuation control signals.

30. The controller of claim 29, wherein each of the thrust reverser controller channels is additionally operable to transmit locking mechanism control signals.

31. The controller of claim 29, wherein the thrust reverser controller channels include a thrust reverser controller primary channel and a thrust reverser controller alternate channel.

32. The controller of claim 31, wherein the thrust reverser controller primary and alternate channels each have an interchannel communication circuit operable to communicate the command signals received in its thrust reverser controller channel to the other thrust reverser controller channel.

33. The controller of claim 32, wherein each of the interchannel communication circuits is further operable to communicate thrust reverser controller channel health one with another.

34. The controller of claim 31, wherein the thrust reverser controller primary and alternate channels each include control power circuitry operable to supply operational control power to their respective channels.

35. The actuation system of claim 31, wherein the thrust reverser controller primary and alternate channels each include locking mechanism control circuitry operable, in response to the command signals received by their respective channels, to transmit thrust reverser lock actuation signals.

36. The actuation system of claim 35, wherein the thrust reverser controller primary and alternate channels each include sensor signal conditioning circuitry operable to receive sensor signals and supply conditioned sensor signals.

37. The controller of claim 36, further comprising:
 a tertiary channel that is electrically and physically isolated from the thrust reverser controller primary and alternate channels, the thrust reverser controller tertiary channel including thrust reverser locking mechanism control circuitry and sensor signal conditioning circuitry therein.

38. The actuation system of claim 31, wherein the primary and alternate channels are physically isolated from one another.

* * * * *